March 3, 1959 R. A. SLUSSER 2,876,365

TRANSISTOR RING TYPE DISTRIBUTOR

Filed April 20, 1953 2 Sheets-Sheet 1

INVENTOR

RICHARD A. SLUSSER

BY Emery Robinson

ATTORNEY

INVENTOR
RICHARD A. SLUSSER
BY Emery Robinson
ATTORNEY

United States Patent Office 2,876,365

Patented Mar. 3, 1959

2,876,365

TRANSISTOR RING TYPE DISTRIBUTOR

Richard A. Slusser, Palatine, Ill., assignor to Teletype Corporation, Chicago, Ill., a corporation of Delaware Application April 20, 1953, Serial No. 349,637

10 Claims. (Cl. 307—88.5)

This invention relates to transistor ring type distributors and more particularly to a distributor having a series of transistors individually actuated in step-by-step fashion upon application of a train of pulses over a common lead to elements associated with each transistor.

The present invention is concerned with a network comprising a plurality of tandem connected circuit stages, each of which has more than one state of stability. A characteristic of this type of network is the ability of having one stage in a first predetermined state of stability while the remaining stages are maintained in a second predetermined state of stability. Upon the application of a train of operating pulses to the network, the stage in the first stability state is successively advanced under the control of the individual pulses. Circuit networks of this type find many commercial applications such as in electrical counters, computers, frequency dividers, telegraph or other types of distributors, etc., wherein it is desired to rapidly apply trains of or individual pulses to the network to obtain either a single output or a plurality of outputs at the same or different frequencies.

A primary object of the invention is to provide a simple reliable electric network having a multitude of stages wherein a train of pulses is accommodated to successively change the stability state of succeeding component stages.

It is a further object of the invention to provide a multi-stage network having transistors as the active element to control each stage.

Adjunct to the first object, the invention contemplates a multi-stage network wherein a change in stability of one component stage from a first predetermined state to a second predetermined state is reflected in the change in the stability of the next component stage from the second predetermined state to the first predetermined state.

A still further object of the invention resides in a multi-stage network wherein the maintenance of one stage in a first predetermined state of stability precludes all other stages, normally maintained in a second state of stability, from assuming the first state.

Another object of the invention resides in a multi-stage transistor network wherein each transistor stage is electrically coupled to the next succeeding stage whereby the impression of a series of pulses successively shuts off a transistor and renders the next succeeding transistor conductive.

An additional object of the invention is to provide a multi-stage transistor network wherein the application of a series of pulses renders the transistors conductive in step-by-step fashion in one direction or in an opposite direction upon change in conditioning potential.

With these and other objects in view the present invention contemplates a multi-stage network wherein each stage includes a transistor having a base electrode, an emitter electrode and a collector electrode. Each of the collectors is connected to a common source of negative potential and each of the emitters is connected to a common lead. The collector associated with each transistor is coupled through a capacitance to the base of the next succeeding transistor to form a closed ring.

In the circuit network just described one transistor stage assumes a stable conductive state and all the other transistor stages are maintained in a stable nonconductive state. Upon application of a negative pulse to the common lead, the conducting transistor is rendered nonconducting and thereupon applies a negative pulse through the capacitive coupling to the base of the next succeeding transistor stage. The appearance of a negative potential on the next succeeding transistor base renders that transistor conductive.

A further feature of the invention provides a basic circuit such as generally described but with the addition of elements that permit the direction in which each succeeding stage is rendered conductive to be reversed.

Other objects and advantages of the present invention will be apparent from the following detailed description when considered in conjunction with the accompanying drawings wherein.

Figures 1, 2, 3:
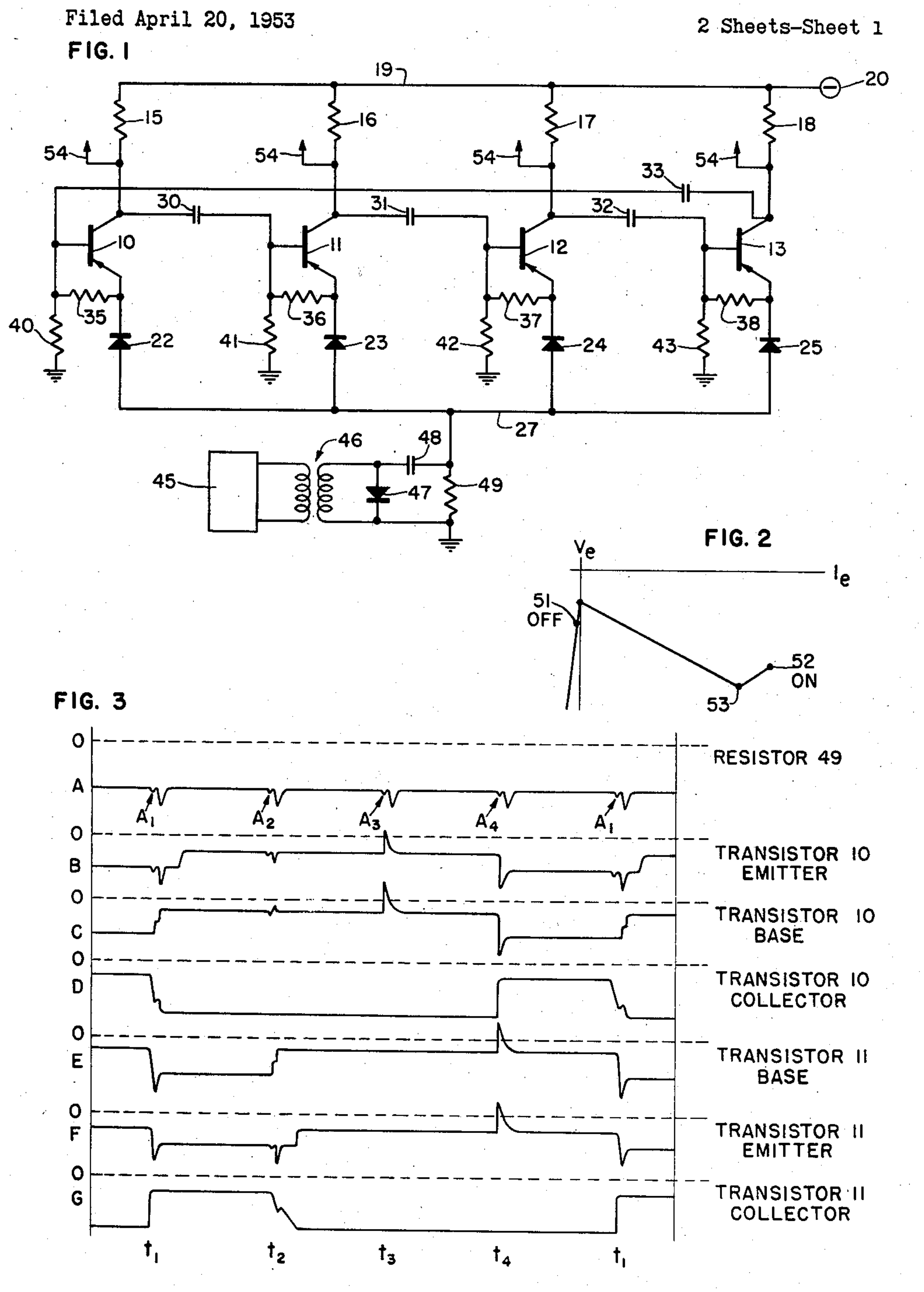
Fig. 1 is a circuit diagram of a multi-stage transistor distributor embodying the principal features of the invention.
Fig. 2 is a diagram illustrating the operating characteristics of an emitter of a transistor.
Fig. 3 is a timing diagram illustrating the change in potentials of two stages of the distributor upon application of an actuating pulse.

Referring to Fig. 1, there is shown a multi-stage distributor wherein each stage includes a semiconductive triode of the type known as a transistor. These transistors 10, 11, 12 and 13 comprise bodies of n-type semiconductive material such as germanium, with which are associated three electrodes known as emitters, bases, and collectors. The collectors associated with the transistors are connected through resistances 15, 16, 17 and 18 to a common lead 19 having negative battery 20 applied thereto. The emitter of each transistor is connected through respective nonlinear resistance elements or rectifiers denoted by the reference numerals 22, 23, 24 and 25 to a common lead 27. The collectors are connected through capacitances 30, 31, 32 and 33 to the bases of each succeeding transistor to form a closed ring. The emitters are coupled through resistances 35, 36, 37 and 38 to their respective bases thereby providing a means for determining the emitter bias to each transistor. The base of each transistor is also connected through respective resistances 40, 41, 42 and 43 to ground.

Associated with the common lead 27 is a pulsing device which comprises a source or generator of rectangular current pulses which is designated by the reference numeral 45. The generator 45 supplies pulses to a transformer 46 having its secondary winding shunted by a nonlinear resistance or rectifier 47. A capacitance 48 is interposed between the lead 27 and the junction of the upper end of the secondary winding of the transformer 46 and the rectifier element 47. Connected in parallel with the rectifier 47 and capacitance 48 is a grounded resistance 49.

Considering now the operation of the distributor, assume that negative battery 20 has been applied to the network. Then, due to the inherent characteristics of the transistors, one of said transistors will be rendered conductive and the other transistors will be maintained in a nonconductive or shut off state. For purposes of illustration, consider that transistor 10 has been rendered conductive. This change in operating condition is illustrated in Fig. 2 which is a typical characteristic curve showing a plot of emitter current vs. emitter voltage for various operating conditions of the transistor used with the base resistance 40. When transistor 10 is shut off, the operating condition of the transistor is designated by the reference numeral 51 and when the transistor is rendered conductive the operating condition rapidly shifts to a point on the curve denoted by reference numeral 52. The characteristic curves for the other transistors 11, 12 and 13 are identical to the curve shown in Fig. 2, hence the operating conditions of the other transistors are maintained at a point corresponding to point 51. Once a transistor, such as transistor 10, initiates conduction its emitter voltage drops, hence maintaining a conditioning potential on the emitter side of the rectifier 22 which is more negative with respect to lead 27 than that applied to the emitter side of the other rectifiers 23, 24 and 25, consequently, the flow of current from ground through the resistance 49 over the lead 27 is directed through the rectifier 22. Attention is directed to the fact that the other transistors 11, 12 and 13 are in a shut off condition, hence the emitter potentials are positive with respect to the potential on lead 27 to maintain the rectifiers 23, 24 and 25 in their high impedance condition thereby precluding the passage of any current therethrough.

Upon application of a square wave pulse to the transformer 46, the positive excursion of the pulse, induced in the secondary winding thereof, is shunted by the low forward resistance of the rectifier or diode 47 to ground. The negative excursion of the pulse, induced in the secondary winding of the transformer 46, is applied to the capacitance 48 to momentarily effectuate a diversion of a substantial portion of the current normally flowing from ground to the emitter of transistor 10.

Referring to Fig. 2 it may be seen that the reduction of emitter current causes the operating point to shift to a region to the left of the valley point 53 of the characteristic curve which is a region of instability. When the operating point passes from a stable conductive region on the characteristic curve to an unstable region, the process invariably continues until a stable nonconductive point on the curve is reached and such a point is denoted by numeral 51. As previously indicated, this point 51 is representative of a stable nonconductive condition of the transistor 10. The low impedance path previously provided by the rectifier 22 is thereupon converted to a high impedance path to preclude the further passage of current to transistor 10. Upon the transistor 10 assuming a nonconductive state, its collector potential simultaneously drops and this drop in potential is presented to capacitance 30 wherein it is differentiated to provide a negative pulse which is applied to the base of the transistor 11. The base of the transistor 11 is thereby driven negative with respect to its emitter, hence the transistor 11 is rendered conductive.

It is to be noted that only the sharply differentiated negative going portion or excursion of the operating pulse is utilized to shut transistor 10 off, consequently operating pulses of varying time duration may be utilized. Inasmuch as the differentiated negative going portion of the pulse is only of minute time duration (in the order of one microsecond) then the negative pulse is dissipated so that it is possible to render the transistor 11 conductive upon application of the negative pulse to the base of transistor 11 following shut off of transistor 10.

The operation of the network may be further enhanced by reference to Fig. 3 wherein the drive pulses applied to the lead 27 are denoted by the reference characters A1, A2, A3, A4, etc. The voltage condition of the emitter of the transistor 10 with respect to ground is indicated by the wave form B. This wave form indicates that, during conduction of the transistor, the emitter is maintained at a value more negative than during shut off. Wave form C illustrates the potential condition of the base with respect to ground of the transistor 10. This wave form indicates that the base is maintained at a more negative potential during conducting than during nonconducting periods, however, during conduction, the base is maintained at a value negative with respect to the emitter, but upon the application of a negative pulse A1 the emitter is driven negative with respect to the base to effectuate the shutting off of the transistor 10. Wave form D illustrates the potential condition of the collector of the transistor 10 and an examination of the wave form discloses that upon shut off of the transistor 10, the potential of the collector drops from a moderately negative value to a negative value of considerable magnitude.

Still referring to Fig. 3 the wave form E illustrates the potential condition of the base of the transistor 11 and observation of this wave form instantly reveals that upon a drop in potential of collector of the transistor 10, a drop in potential is imparted to the base of the transistor 11. As previously indicated this change in potential on the base 11 which is in a negative direction makes the emitter momentarily positive with respect to the base and consequently renders the transistor 11 conductive. Wave form F illustrates the condition of the emitter of the transistor 11 and an examination of this wave form reveals that the emitter potential is driven to a value of negative potential upon the transistor 10 shutting off, however, not as negative as its base. The appearance of the negative going pulse on base of transistor 11 is also applied to the emitter through resistor 36 and when the emitter voltage becomes equal to the voltage on lead 27 then rectifier 23 assumes its low impedance condition to preclude the further drop in emitter voltage. The base voltage continues to drop, however, rendering the transistor 11 conductive. An examination of wave form G indicates that upon the transistor 11 being rendered conductive at a time T1 the collector potential rises from a negative value of considerable magnitude to a negative value of moderate magnitude.

Outputs may be obtained from the network through a plurality of leads 54. When the network is utilized as a distributor, outputs will be taken off each of the leads 54. In the situation where it is desired to use the present network as a frequency divider, then the application of pulses by the square wave generator 45 can be considered the input frequency, then in order to divide this frequency, output will be taken off of one or more of the output leads 54. It is to be further understood that the disclosed number of stages, four in the present instance, is merely illustrative and that the number of stages may be extended or multiplied by the simple addition of stages containing component elements such as shown associated with each stage.

Referring again to Fig. 3 and more particularly to wave form C it may be noted that at time T3 a positive pulse appears on the base of transistor 10 which is the time that transistor 13, is rendered conductive. As will be recalled, the rendering conductive of any transistor causes its collector potential to rise and this rise in potential of the collector of the transistor 13 is impressed through the capacitor 33 to the base of the transistor 10, but this rise in potential is ineffective to change the state of stability of the transistor 10. The rise in potential on each collector due to each succeeding transistor being rendered conductive is also impressed through the succeeding resistances 35, 36, 37 and 38, but the rectifiers 22, 23, 24 and 25 function to block the positive pulses and consequently the potential of lead 27 is not raised.

Figures 4, 5:
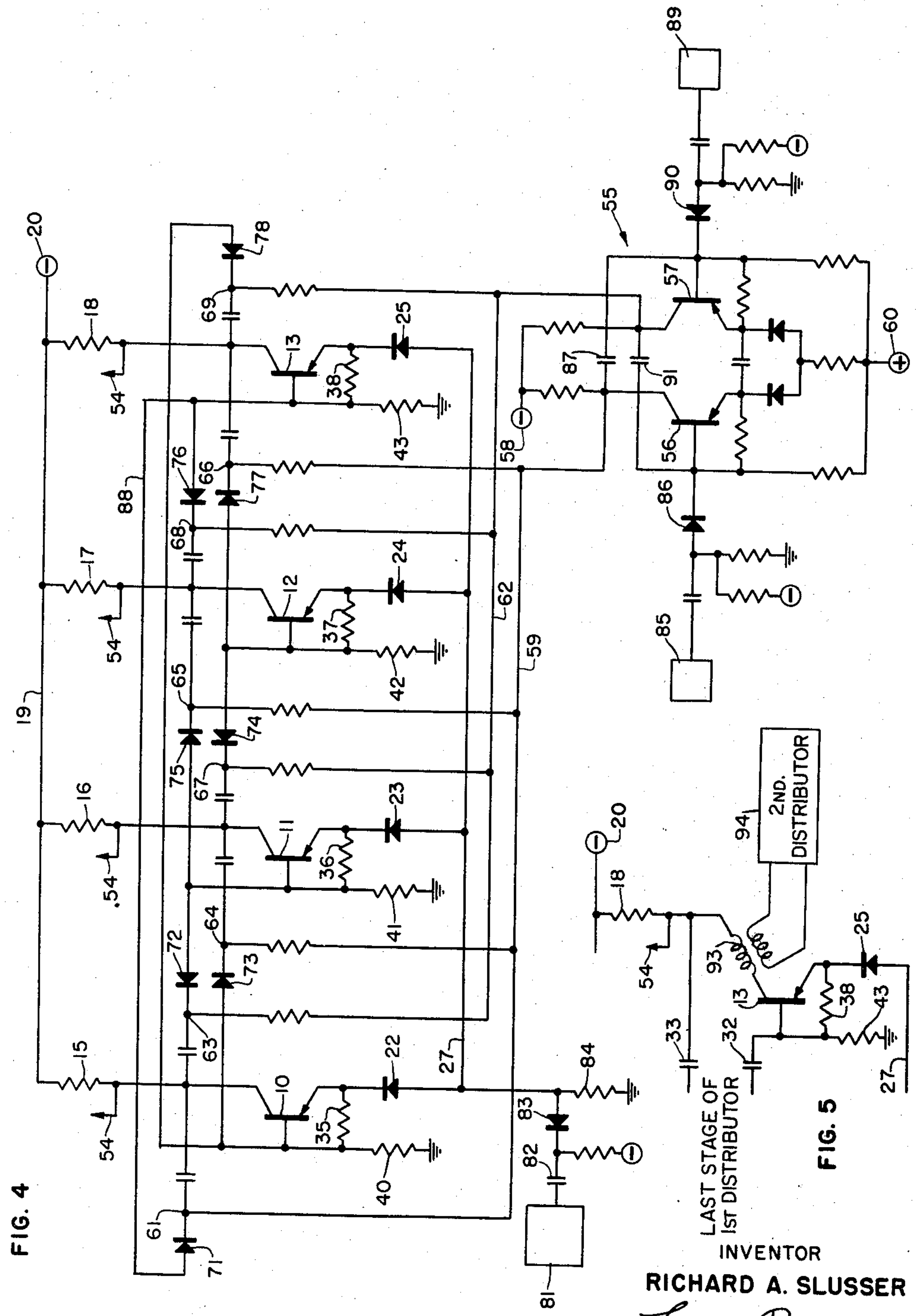
Fig. 4 is a circuit diagram illustrating a multi-stage distributor which may be driven in opposite directions embodying additional features of the invention.
Fig. 5 is a circuit diagram of one stage of a distributor which permits another distributor to be connected thereto in cascade fashion.

Attention is directed to Fig. 4 wherein there is disclosed another embodiment of the invention. However, many of the elements disclosed in Fig. 4 and the manner in which they function are identical to the elements shown in Fig. 1, consequently, identical reference numerals will be used in Figs. 1 and 4 to identify identical parts. In Fig. 1 the circuit therein described operated so that the transistors 10 to 13 operated in a succeeding forward order, whereas in the network shown in Fig. 4 means are provided for operating the network in either a forward or reverse direction.

There is shown in Fig. 4 a binary circuit generally designated by the reference numeral 55 which consists of two transistors 56 and 57 each of which has its collector connected to a source of negative potential 58. The emitter and bases are connected to a source of positive potential 60. When negative battery 58 and positive battery 60 are applied to the binary 55, one or the other of the transistors 56 or 57 will assume a conductive condition due to the inherent characteristics of the circuit. For purposes of illustration assume that transistor 56 is rendered conductive then its collector potential will rise and become positive and this rise is impressed over a common lead 59 to a junction point 61. Inasmuch as the transistor 57 is maintained in a nonconductive condition its collector will be maintained at a negative potential of considerable magnitude near that of the potential of source 58 which will be impressed over a common lead 62 to a junction point 63. In a like manner the positive collector potential of the transistor 56 is impressed over the common lead 59 to the junction points designated 64, 65 and 66 whereas the relatively large negative potential of the collector of the transistor 57 is impressed over the common lead 62 to junction points 67, 68 and 69. Associated with the junction points 61 and 63 is a pair of rectifier diodes 71 and 72, respectively. Associated with the junction points 64 and 67 is a pair of rectifier diodes 73 and 74, respectively, and associated with the junction points 65 and 68 is another pair of rectifier diodes 75 and 76. In a like manner a pair of rectifier diodes 77 and 78 is associated respectively with the junction points 66 and 69. The appearance of a positive potential at junction point 61 strongly biases rectifier 71 in its high impedance or nonconducting direction whereas the appearance of a relatively large negative potential at junction point 63 tends to bias the rectifier diode 72 in its low impedance or conducting direction.

In the lower left-hand portion of Fig. 4 there is illustrated a source or generator of square wave pulses designated by the reference numeral 81. Output of generator 81 is differentiated by a capacitor 82 and the positive going pulse is prevented from appearing on lead 27 due to the action of a rectifier diode 83, however, the negative going portion of the differentiated square wave pulse passes through the diode 83 and is applied to the resistor 84 which is connected through lead 27 to rectifier diodes 22 to 25, inclusive.

For purposes of illustrating the operation of this network, assume that the transistor 56 is conducting and the transistor 10 is also conducting. Then, upon the appearance of a negative pulse, from a differentiated square wave at the junction of capacitor 82 and diode 83, causes diode 83 to become momentarily conductive and current passes from ground through resistor 84 and diode 83 to charge condenser 82. Passage of current through rectifier diode 83 momentarily interrupts the current flowing to the emitter of transistor 10, in the same manner as described in regard to the network shown in Fig. 1, and the transistor 10 is rendered nonconductive. Upon the transistor 10 being rendered nonconducting, its collector potential immediately drops and this drop in potential is passed to the junction points 61 and 63. Inasmuch as the junction point 61 is maintained at a positive potential, the appearance of the negative pulse thereat is ineffective to pass the diode 71. The junction point 63 being maintained at a negative potential enables the negative impulse to render rectifier diode 72 momentarily conductive. This negative impulse therefore appears on the base of the transistor 11 to cause the base thereof to be driven negative with respect to the emitter, and consequently the transistor 11 is rendered conductive.

It may be appreciated that upon further application of pulses by the generator 81, the transistors 10 to 13, inclusive, are successively rendered conductive from left to right.

Consider now the means for reversing the direction of operation of the network which is accomplished by applying a positive pulse from a source 85 which passes through rectifier diode 86 and appears on the base of the conducting transistor 56 to render this transistor nonconductive. Upon the transistor 56 being rendered nonconductive, its collector potential drops and this drop in potential is impressed through a condenser 87 to produce a negative pulse which is passed to the base of the nonconducting transistor 57. Upon the appearance of a negative pulse on the base of the transistor 57, this transistor is instantly rendered conductive. The drop in collector potential of the transistor 56 is impressed over the lead 59 to cause the potential of the junction points 61, 64, 65 and 66 to drop from a positive potential to a negative potential. When the transistor 57 is rendered conductive, its collector potential rises to a positive value and this rise in potential is impressed over the lead 62 to impress positive potential on the junction points 63, 67, 68 and 69. It may be thus appreciated that the potential of the junction points is reversed, that is, the junction points that were previously maintained at a negative potential are now maintained at a positive potential, and those junction points which were previously maintained at a positive potential are now conditioned with a negative potential.

Considering now the operation of the network in the reverse direction and assuming that the transistor 10 is in a conductive state then the appearance of a negative pulse on the diode 83 renders transistor 10 nonconductive. Upon the transistor 10 being rendered nonconductive, its collector potential drops. Inasmuch as the potential on junction point 63 is positive, the negative pulse is not passed through the diode 72. The drop in collector potential of the transistor 10 is also impressed on the junction point 61 which is already maintained at a negative potential; therefore, the negative pulse passes through the rectifier diode 71. This negative pulse is impressed over a lead 88 to the base of the transistor 13 to render this transistor conducting. In a like manner the application of another differentiated negative pulse to the rectifier diode 83 causes the transistor 13 to be rendered nonconductive and transistor 12 is rendered conducting.

It may be appreciated that upon subsequent generation of pulses by the generator 81 the transistors 13 to 10, inclusive, are rendered conductive in a direction from right to left as illustrated in Fig. 4.

The network may be reverted back to operation in a forward direction by the application of a positive pulse from a source 89 which causes a positive pulse to pass through a rectifier diode 90 to effectuate the shutting off of the transistor 57. Upon the transistor 57 being shut off, its collector potential drops and this drop in potential is impressed through a condenser 91 to the base of the non-conducting transistor 56 to render this transistor conducting. The network is now restored to a condition which permits forward or left to right operation of the transistors 10 to 13, inclusive.

Referring now to Fig. 5 there is shown an added feature of the invention wherein the last stage of a distributor such as shown in Fig. 1 is provided with a transformer winding 93 connected in series with the collector of the transistor 13. When transistor 13 is in a state of nonconduction, the voltage across the capacitor 33 is allowed to charge to a relatively large value approaching the value of source 20. Upon the transistor 13 being rendered conducting, capacitor 33 discharges to produce an instantaneous surge of collector current which is passed through winding 93. The surge of current is only of transient duration and the collector current then assumes its steady state value.

It may be appreciated that the winding 93 may be used as a primary of a transformer such as transformer 46 shown in Fig. 1, thus, the current surge appearing in winding 93 can be utilized to drive a second distributor designated by the numeral 94 in Fig. 5, in cascade fashion.

It is to be understood that the above described networks and arrangement of component electric circuits are simply illustrative of the application of the principles of the invention and many other modifications may be made without departing from the invention.

What is claimed is:

1. In an electrical network, a first ring type distributor having a series of stages, a second ring type distributor having a series of stages, a transistor included in each stage of both distributors, each of said transistors having a base, an emitter and a collector, means for electrically coupling in each distributor the collector of one transistor with the base of the next succeeding transistor, a pulsing device associated with the first distributor for sequentially shutting off succeeding transistors, each of said transistors upon shutting off effectuating the generation of a pulse to render the next succeeding transistor conductive, a transformer winding connected to the collector of the transistor in the last stage of the first distributor, a second pulsing device including a winding associated with said collector winding whereby the shutting off of the last transistor in the first distributor produces a pulse to render nonconductive any conductive transistor in the second distributor and effectuates the conduction of the transistor in the next succeeding stage of the second distributor.

2. In a distributor, a series of transistors arranged in a ring, each of said transistors having a base electrode, an emitter electrode and a collector electrode, a first set of means connecting the collector electrode of each transistor to the base electrode of the next succeeding transistor, a second set of means connecting the collector of each transistor to the base of the next preceeding transistor, rectifier means connected in each collector to base connecting means, and means for biasing said rectifier means to permit the passage of negative pulses over only one set of connecting means.

3. In a multi-stage network wherein each stage has included therein a transistor, means for rendering one of said transistors conductive, means for applying a train of pulses to all said stages whereby each pulse diverts the current flowing in the conductive transistor to render said transistor nonconductive, means coupling each stage to the next succeeding stage for applying the change in conductive state of a transistor as an operating potential to render said next succeeding transistor conductive, means coupling each stage to the next preceding stage for applying the change in conductive state of a transistor as an operating potential to render said next preceding transistor conductive, and means for preventing the application of operating potential over one of said couplings and aiding the application over the other of said couplings.

4. In a multi-stage network wherein each stage has included therein a transistor, means for rendering one of said transistors conductive, means for applying a train of pulses to all said stages whereby each pulse effectuates a shutting off of the conducting transistor, first means coupling each stage to the next succeeding stage for applying the change in conductive state of a transistor as an operating potential to render conductive said next succeeding transistor, second means coupling each stage to the next preceding stage for applying the change in conductive state as an operating potential to render conductive said next preceding transistor, means for preventing the application of potential over the first coupling means, means for abetting the application of potential of said second coupling means, and means for reversing the preventing means and abetting means.

5. In a distributor, a series of transistors each of said transistors having a base, an emitter and a collector, means connecting each collector with both the bases of the next succeeding and next proceeding transistors to form a closed ring, rectifier means connected in each connecting means, means for biasing the rectifiers in one connecting means toward conduction and the other rectifiers away from conduction, means for applying potential to said distributor to render one transistor conductive and the other transistors nonconductive, means for diverting the current flowing to the conducting transistor to render said transistor nonconductive, said transistor being rendered nonconductive having its collector potential drop, said drop in potential being effective to further bias the rectifier associated therewith toward its low impedance condition whereby the base potential of the next succeeding transistor drops to render this transistor conductive, and means for reversing the biasing potential applied to the rectifiers to reverse the direction of application of the drop in collector potential.

6. In a multi-stage network, a transistor included in each stage having a base, an emitter and a collector, first means coupling each collector with the base of the next succeeding transistor, second means coupling each collector with the base of the next preceding transistor, a rectifier element included in each coupling means biased to present a high impedance to current flowing away from the collector, means for biasing the rectifiers in the first coupling means toward their high impedance condition, means for biasing the rectifiers in the second coupling means toward their low impedance condition, means for applying potential to all the stages of said network to render one of said transistors conductive, means for momentarily diverting the current flowing through the emitter of the conducting transistor to shut off said transistor, said shutting off of the transistor effectuating a drop in collector potential whereby the rectifier biased towards conduction is rendered conductive to impress a drop in potential on the base of the next succeeding transistor to render this transistor conductive, and a binary circuit for reversing the biasing potentials applied to the rectifiers.

7. In a distributor, a series of transistors each having a base, an emitter and a collector, means connecting all collectors to a common source of biasing potential whereby one of the transistors is placed in a first stable state such that current flows to its emitter and the remaining transistors are placed in a second stable state, a unidirectional-current device connected to each emitter such that only the device connected to a transistor in the first stable state is conducting, means for generating a pulse, means for applying the generated pulse to all unidirectional-current devices simultaneously to interrupt the current flowing to the emitter of the transistor in the first state, said interruption of emitter current being effective to place the transistor in the second stable state, and means coupling the collector of each transistor to the base and to the emitter of the next-succeeding transistor whereby the assumption of a second stable state by a transistor is simultaneously accompanied by a pulse which is passed through the coupling means and the magnitude of which as applied to the emitter is limited by the unidirectional-current device associated with said next-succeeding transistor to immediately place said next-succeeding transistor in the first stable state.

8. In a ring-type distributor, a series of transistors, each transistor having a base, an emitter and a collector, means for connecting biasing potential to all collectors to render only one transistor conductive at any given time and to maintain the other transistors nonconductive at such time, a rectifier connected to each emitter such that only the rectifier connected to a conducting transistor is conductive, means connected to the rectifiers for producing an operating pulse to interrupt the current flowing to the conducting transistor through the conducting rectifier, whereby said conducting transistor is rendered nonconductive, and means for impressing the initial change in collector potential due to the conducting transistor being rendered nonconductive on the base and emitter of the next-succeeding transistor, the initial change in potential on the emitter of said next-succeeding transistor being limited by the rectifier associated therewith, whereby the base potential continues to change to render said next-succeeding transistor conductive immediately upon the conducting transistor being rendered nonconductive.

9. In a distributor, a series of transistors, each transistor having a base, an emitter and a collector, a rectifier connected to the emitter of each transistor, means for connecting each base to the emitter of its associated transistor, means for connecting biasing potential to all collectors to render only one transistor conductive at any given time and to render the other transistors nonconductive at such time, means for applying an operating pulse to all of the rectifiers simultaneously to interrupt the current flowing through the emitter of the conductive transistor, whereby the conducting transistor is rendered nonconductive, and means for applying the drop in collector potential due to the conducting transistor being shut off to the base and, through the emitter-base connecting means, to the emitter of the next-succeeding transistor, whereby the drop in emitter potential of said next-succeeding transistor is limited by the rectifier associated therewith being rendered conductive so that the base-emitter potential is permitted to render said next-succeeding transistor conductive immediately upon the conducting transistor becoming nonconductive.

10. A counter circuit which comprises a series of transistors each of which includes a base, an emitter and a collector, means for connecting each transistor base to its associated emitter, biasing means for maintaining only one transistor conductive at any time, a plurality of rectifiers, one side of each of the rectifiers being connected to one of the emitters and the other sides of all of the rectifiers being connected commonly and such that the rectifier associated with a conducting transistor is also conductive, means for applying an operating pulse to the common connection of the rectifiers to interrupt the current flowing through the rectifier associated with the conducting transistor and to render such transistor nonconductive, means for connecting the collector associated with each transistor to the base of the next-succeeding transistor and, through the associated base-emitter connection, to the emitter of the next-succeeding transistor, the potential change on the collector of the conducting transistor upon its being rendered nonconductive being applied by the last-mentioned means to the base and emitter of said next-succeeding transistor and the rectifier connected to the emitter of said next-succeeding transistor limiting the potential being applied thereto so that a sufficient potential difference between the emitter and the base results in rendering said next-succeeding transistor conductive immediately upon the conducting transistor being rendered nonconductive.

References Cited in the file of this patent

UNITED STATES PATENTS

| | | |
|---|---|---|
| 2,591,961 | Moore, et al. | Apr. 8, 1952 |
| 2,594,336 | Mohr | Apr. 29, 1952 |
| 2,614,141 | Edson et al. | Oct. 14, 1952 |
| 2,622,212 | Anderson et al. | Dec. 16, 1952 |
| 2,627,039 | MacWilliams | Jan. 27, 1953 |
| 2,644,896 | Lo | July 7, 1953 |
| 2,644,897 | Lo | July 7, 1953 |
| 2,652,501 | Wilson | Sept. 15, 1953 |
| 2,735,005 | Steele | Feb. 14, 1956 |